US012550021B2

(12) United States Patent
Sun et al.

(10) Patent No.: US 12,550,021 B2
(45) Date of Patent: Feb. 10, 2026

(54) BANDWIDTH ADJUSTMENT METHOD AND RELATED DEVICE

(71) Applicant: HUAWEI TECHNOLOGIES CO., LTD., Shenzhen (CN)

(72) Inventors: Liang Sun, Dongguan (CN); Junling Xiang, Shenzhen (CN); Zhaoming Gong, Dongguan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 720 days.

(21) Appl. No.: 17/966,581

(22) Filed: Oct. 14, 2022

(65) Prior Publication Data
US 2023/0045051 A1 Feb. 9, 2023

Related U.S. Application Data

(63) Continuation of application No. PCT/CN2021/083799, filed on Mar. 30, 2021.

(30) Foreign Application Priority Data

Apr. 15, 2020 (CN) .......................... 202010296430.8

(51) Int. Cl.
*H04W 4/00* (2018.01)
*H04L 5/00* (2006.01)
*H04W 36/06* (2009.01)
*H04W 72/0453* (2023.01)

(52) U.S. Cl.
CPC ........... *H04W 36/06* (2013.01); *H04L 5/0053* (2013.01); *H04W 72/0453* (2013.01)

(58) Field of Classification Search
None
See application file for complete search history.

(56) References Cited

U.S. PATENT DOCUMENTS

| 2007/0104485 | A1* | 5/2007 | Zhang | ................... H04J 3/1664 398/69 |
| 2011/0032937 | A1 | 2/2011 | Gould et al. | |
| 2015/0381280 | A1* | 12/2015 | Shirai | ................... H04J 3/1652 398/79 |

(Continued)

FOREIGN PATENT DOCUMENTS

| CN | 101155016 A | 4/2008 |
| CN | 100590997 C | 2/2010 |
| CN | 103688499 A | 3/2014 |

(Continued)

*Primary Examiner* — Zewdu A Beyen
(74) *Attorney, Agent, or Firm* — Leydig, Voit & Mayer, Ltd.

(57) ABSTRACT

Embodiments of the present disclosure provide a bandwidth adjustment method and a related device, configured to adjust a bandwidth of a first payload subarea included in a transmission frame flexibly. The method of embodiments of this application includes the following steps: First, determine the first payload subarea and a second payload subarea from a payload area of the transmission frame; second, determine that a bandwidth of at least one service does not match a bandwidth of the first payload subarea; finally, adjust the bandwidth of the first payload subarea, where an adjusted bandwidth of the first payload subarea matches the bandwidth of the at least one service.

18 Claims, 6 Drawing Sheets

(56) References Cited

U.S. PATENT DOCUMENTS

2016/0028638 A1 1/2016 Jin

FOREIGN PATENT DOCUMENTS

| CN | 106303766 | A | 1/2017 | | |
|---|---|---|---|---|---|
| CN | 107566074 | A | 1/2018 | | |
| CN | 108632061 | A | 10/2018 | | |
| CN | 109951896 | A | 6/2019 | | |
| EP | 4075820 | A1 | 10/2022 | | |
| RU | 2707572 | C1 | 11/2019 | | |
| WO | WO-2014015918 | A1 * | 1/2014 | .......... | H04J 14/0273 |

* cited by examiner

BANDWIDTH ADJUSTMENT METHOD AND RELATED DEVICE

CROSS-REFERENCE TO RELATED APPLICATIONS

This application is a continuation of International Application No. PCT/CN2021/083799, filed on Mar. 30, 2021, which claims priority to Chinese Patent Application No. 202010296430.8, filed on Apr. 15, 2020. The disclosures of the aforementioned applications are hereby incorporated by reference in their entireties.

TECHNICAL FIELD

This application relates to the field of optical communications, and in particular, to a bandwidth adjustment method and a related device.

BACKGROUND

In an existing optical communication network, a transmission frame used to bear a service includes a first payload subarea and a second payload subarea. The first payload subarea is divided into a plurality of payload blocks (PB).

A total quantity of payload blocks in each transmission cycle in the first payload subarea is fixed. One or more services are mapped to the payload block included in the transmission cycle. If a bandwidth of the one or more services is decreased, some payload blocks included in the transmission cycle are not fully used. This reduces bandwidth resource utilization of the transmission frame. If a bandwidth of the one or more services is increased and the bandwidth is greater than a bandwidth of the first payload subarea, the service cannot be mapped to the first payload subarea. Consequently, service transmission fails.

SUMMARY

Embodiments of this application provide a bandwidth adjustment method and a related device, to flexibly adjust a bandwidth of a first payload subarea of a transmission frame.

According to a first aspect, an embodiment of the present disclosure provides a bandwidth adjustment method. The method includes: First, a network device determines a first payload subarea and a second payload subarea from a payload area of a transmission frame, where division manners of the first payload subarea and the second payload subarea are different, the first payload subarea is divided into a plurality of payload blocks used to bear at least one service, and a service borne in the first payload subarea is different from a service borne in the second payload subarea; next, the network device determines that a bandwidth of the at least one service does not match a bandwidth of the first payload subarea; and finally, the network device adjusts the bandwidth of the first payload subarea, where an adjusted bandwidth of the first payload subarea matches the bandwidth of the at least one service.

That the division manners of the first payload subarea and the second payload subarea are different may indicate that an object obtained by dividing the first payload subarea and an object obtained by dividing the second payload subarea are different. The object obtained by dividing the first payload subarea is a payload block. The object obtained by dividing the second payload subarea is a timeslot or a code block. Alternatively, that the division manners of the first payload subarea and the second payload subarea are different may indicate that a quantity of bytes included in an object obtained by dividing the first payload subarea and a quantity of bytes included in an object obtained by dividing the second payload subarea are different. Alternatively, that the division manners of the first payload subarea and the second payload subarea are different may indicate that a manner of arranging objects obtained by dividing the first payload subarea and a manner of arranging objects obtained by dividing the second payload subarea are different. For example, payload blocks in one transmission cycle included in the first payload subarea are arranged in a horizontal direction, and timeslots included in the second payload subarea are arranged in a vertical direction.

In an embodiment, the network device can simultaneously bear different services based on the first payload subarea and the second payload subarea. This effectively reduces a service processing delay, reduces a quantity of boards that need to be disposed by the network device, and improves slot utilization of the network device. In addition, the network device can flexibly adjust the bandwidth of the first payload subarea of the transmission frame based on the bandwidth of the at least one service. This effectively ensures successful transmission of the at least one service and bandwidth resource utilization.

Based on the first aspect, in another embodiment, that the network device adjusts the bandwidth of the first payload subarea includes: If the bandwidth of the at least one service is greater than the bandwidth of the first payload subarea, the network device allocates a partial bandwidth of the second payload subarea to the first payload subarea. The network device adjusts the bandwidth by allocating the partial bandwidth of the second payload subarea to the first payload subarea. This can effectively ensure successful transmission of the service. Based on the first aspect, in another embodiment, the method further includes: The network device obtains a first quantity, where the first quantity is a quotient between the bandwidth of the first payload subarea and a bandwidth of the payload block; and the network device increases, to the first quantity, a quantity of payload blocks included in each transmission cycle in the first payload subarea. The network device adjusts, based on the first quantity, the quantity of payload blocks included in each transmission cycle, so that an adjusted transmission cycle can be used to successfully bear the at least one service.

Based on the first aspect, in another embodiment, the method further includes: The network device obtains a first indication message, where the first indication message is used to indicate a first bandwidth of a first service, and the first service is one service whose bandwidth is increased in the at least one service; and the network device determines, from each transmission cycle based on the first indication message, a payload block used to bear the first service, where a bandwidth of the payload block used to bear the first service is greater than or equal to the first bandwidth.

In this embodiment, after adjusting the bandwidth of the first payload subarea, the network device further adjusts a quantity of payload blocks corresponding to the first service. This effectively ensures that the transmission frame is used to successfully bear the first service whose bandwidth has changed.

Based on the first aspect, in another embodiment, the method further includes: The network device obtains a second indication message, where the second indication message is used to indicate a second bandwidth of a second service, and the second service is one service whose bandwidth is decreased in the at least one service; and the network device decreases, to a second quantity based on the second indication message, a quantity of payload blocks used to bear the second service in each transmission cycle in the first payload subarea, where a bandwidth of the second quantity of payload blocks is greater than or equal to the second bandwidth. The quantity of payload blocks corresponding to the second service is adjusted. This effectively ensures that the transmission frame is used to successfully bear the second service whose bandwidth has changed.

Based on the first aspect, in another embodiment, the method further includes: If the bandwidth of the at least one service is less than the bandwidth of the first payload subarea, the network device obtains a third quantity, where a bandwidth of the third quantity of payload blocks is greater than or equal to the bandwidth of the at least one service; and the network device decreases, to the third quantity, a quantity of payload blocks included in each transmission cycle in the first payload subarea. In this implementation, the network device adjusts the quantity of payload blocks included in each transmission cycle, to ensure that the transmission frame can be used to successfully bear the at least one service.

Based on the first aspect, in another embodiment, the network device allocates a partial bandwidth of the first payload subarea to the second payload subarea. In this implementation, when a bandwidth of a to-be-transmitted service is less than the bandwidth of the first payload subarea, the network device adjusts the bandwidth by allocating the partial bandwidth of the first payload subarea to the second payload subarea. This improves bandwidth utilization of the first payload subarea.

Based on the first aspect, in another embodiment, the second payload subarea is divided into a plurality of timeslots, a plurality of code blocks, or a plurality of bytes.

Based on the first aspect, in another embodiment, the transmission frame is an optical transport unit OTU frame, a passive optical network transmission convergence GTC frame, or an optical burst packet.

According to a second aspect, an embodiment of the present disclosure provides a digital processing chip, where the chip includes a processor and a memory. The memory and the processor are connected to each other by using a line, the memory stores instructions, and the processor is configured to perform the bandwidth adjustment method in any one of the implementations of the first aspect. For descriptions of beneficial effects, refer to the first aspect. Details are not described again.

According to a third aspect, an embodiment of the present disclosure provides a network device, including a processor and a memory. The processor and the memory are connected to each other by using a line, and the processor invokes program code in the memory to perform the method in any one of the implementations of the first aspect. For descriptions of beneficial effects, refer to related descriptions of the first aspect.

According to a fourth aspect, an embodiment of the present disclosure provides a computer-readable storage medium including instructions, where when the instructions are run on a computer, the computer is enabled to perform the method in any one of the implementations of the first aspect.

According to a fifth aspect, an embodiment of the present disclosure provides a computer program product including instructions, where when the computer program product is run on a computer, the computer is enabled to perform the method in any one of the implementations of the first aspect.

DESCRIPTION OF EMBODIMENTS

Figure 1:
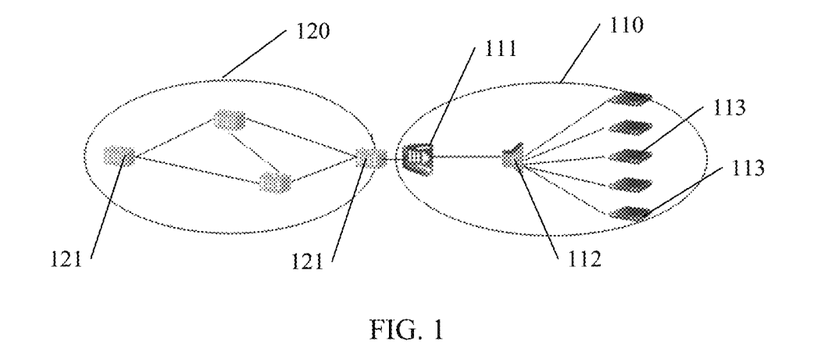
FIG. 1 is a schematic diagram of a structure of an optical communication network according to an embodiment of the present disclosure.

For better understanding of a bandwidth adjustment method provided in this application, the following first describes, with reference to FIG. 1, an optical communication network to which the method in this application is applied. FIG. 1 is a schematic diagram of a structure of an optical communication network according to an embodiment of the present disclosure.

The optical communication network shown in FIG. 1 includes a passive optical network (PON) 110. The PON 110 includes an optical line terminal (OLT) 111, an optical distribution network (ODN) 112, and a plurality of optical network units (ONU) 113. The OLT 111 is connected to the ODN 112. The OLT 111 is connected to the plurality of ONUs 113 in a point-to-multipoint manner by using the ODN 112.

The optical communication network further includes an optical transport network (OTN) 120. The OTN 120 includes a plurality of interconnected OTN devices 121. One OTN device 121 in the OTN 120 is connected to the OLT 111, to implement service interaction. For example, the OTN device 121 may send a service to the PON 110 by using the OLT 111. For another example, the ONU 113 may send a service to the OTN 120 successively by using the ODN 112 and the OLT 111.

Figure 2:
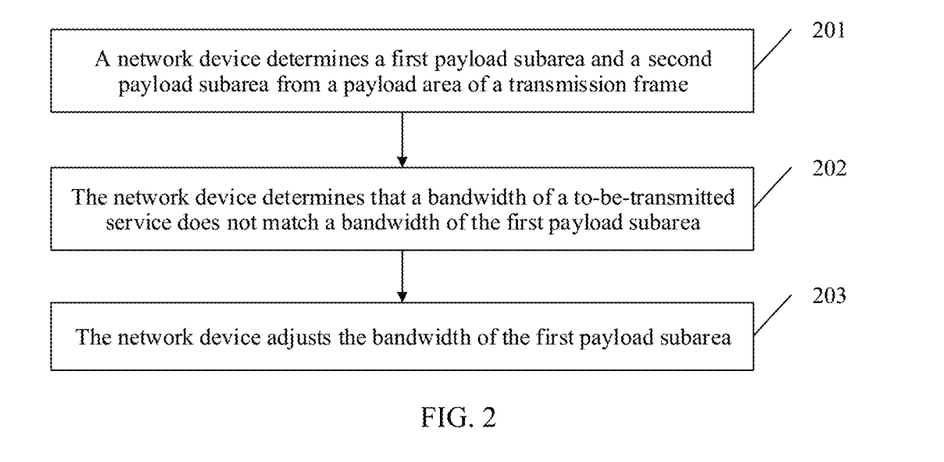
FIG. 2 is a flowchart of steps of a first embodiment of a bandwidth adjustment method according to an embodiment of the present disclosure.

Based on the optical communication network shown in FIG. 1, the following describes, with reference to FIG. 2, a specific execution process of the bandwidth adjustment method provided in this application. FIG. 2 is a flowchart of steps of a first embodiment of a bandwidth adjustment method according to an embodiment of the present disclosure.

Step 201. A network device determines a first payload subarea and a second payload subarea from a payload area of a transmission frame.

A frame structure of the transmission frame shown in this embodiment is a hybrid multiplex frame structure. The hybrid multiplex frame structure is specifically as follows: The payload area of the transmission frame includes the first payload subarea and the second payload subarea. Division manners of the first payload subarea and the second payload subarea are different. A specific quantity of first payload subareas and a specific quantity of second payload subareas are not limited in this embodiment. In this embodiment, an example in which the payload area of the transmission frame includes one first payload subarea and one second payload subarea is used for description. For better understanding, the following describes several cases of the transmission frame.

Figure 3:
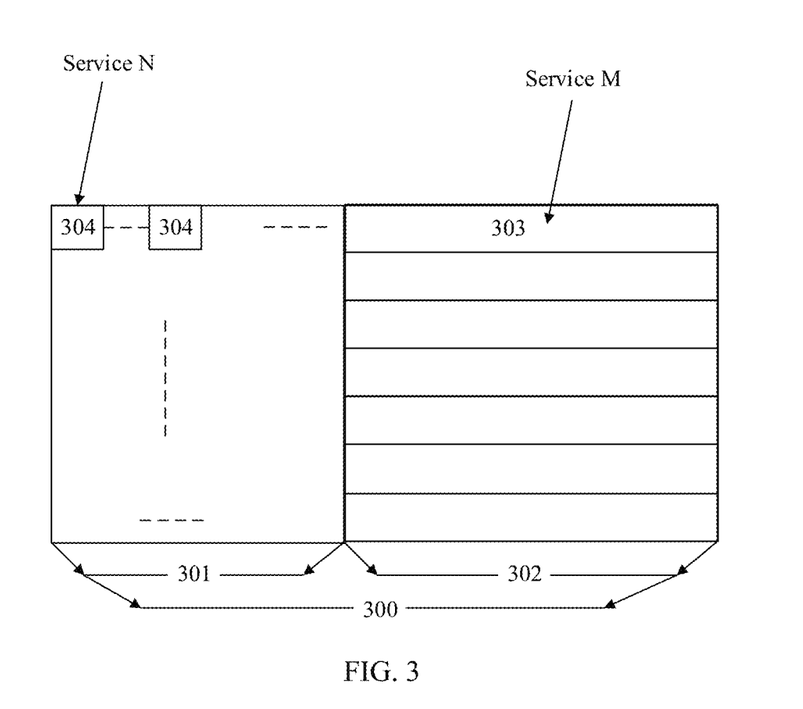
FIG. 3 is a schematic diagram of a first frame structure of a transmission frame according to an embodiment of the present disclosure.

Case 1: The network device is an OTN device, and the transmission frame is an optical transport unit (OTU) frame. FIG. 3 is a schematic diagram of a first frame structure of a transmission frame according to an embodiment of the present disclosure.

A payload area 300 of the OTU frame includes two parts: a first payload subarea 301 and a second payload subarea 302. The first payload subarea 301 is divided into a plurality of payload blocks used to bear a service. The payload block in this application is a frame structure that includes a specific quantity of bytes. The payload block may also be referred to as a subframe, a data block, or a sub-block. This is not specifically limited in this application. A specific quantity of payload blocks included in the first payload subarea 301 is not limited in this embodiment. The second payload subarea 302 is divided into a plurality of timeslots or code blocks used to bear a service. For example, the second payload subarea includes a plurality of 1.25 G timeslots. The code block is a series of bits with a fixed length and a fixed format. The code block with the fixed format includes a bit used to bear a synchronization header, a bit used to bear a type identifier, and a bit used to bear data. A length of the code block is not limited in this embodiment. For example, the length of the code block is 66 bits, 256 bits, 257 bits, or 512 bits.

In this embodiment, an example in which the first payload subarea 301 includes the payload block and the second payload subarea 302 includes the timeslot is used for description. A timeslot 303 in the second payload subarea 302 is used to bear a service M. A payload block 304 in the first payload subarea 301 is used to bear a service N. In this example, a quantity of services M and a quantity of services N are not limited. The service N is a service mapped to the first payload subarea. The service M is a service mapped to the second payload subarea based on a generic mapping procedure (generic mapping procedure, GMP), an asynchronous mapping procedure (asynchronous mapping procedure, AMP), a bit-synchronous mapping procedure (bit-synchronous mapping procedure, BMP), an idle mapping procedure (idle mapping procedure, IMP), or the like.

It may be learned that the hybrid multiplex structure of the transmission frame can bear both the service N and the service M. The network device does not need to implement service bearing by separately disposing an independent board for a transmission frame used to bear the service N and a transmission frame used to bear the service M. The network device requires only one board to bear both the service M and the service N. This effectively reduces a service processing delay, reduces a quantity of boards that need to be disposed by the network device, and improves slot utilization of the network device.

Alternatively, that the division manners shown in this case are different may be that a manner of arranging payload blocks in the first payload subarea 301 and a manner of arranging timeslots in the second payload subarea 302 are different. For example, as shown in FIG. 3, payload blocks in one transmission cycle are arranged in a horizontal direction in the first payload subarea 301, and timeslots are arranged in a vertical direction in the second payload subarea 302. A to-be-transmitted service is borne by using the payload block included in the transmission cycle.

Figure 4:
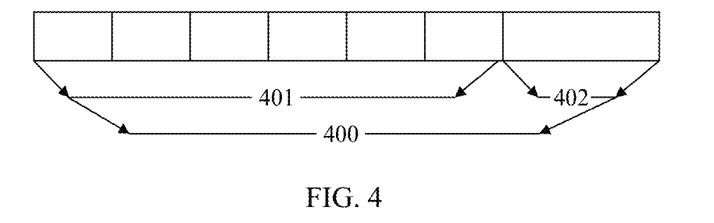
FIG. 4 is a schematic diagram of a second frame structure of a transmission frame according to an embodiment of the present disclosure.

Case 2: The network device is an OLT, and the transmission frame is a passive optical network transmission convergence (GPON transmission convergence, GTC) frame. FIG. 4 is a schematic diagram of a second frame structure of a transmission frame according to an embodiment of the present disclosure.

A payload area 400 of the GTC frame includes a first payload subarea 401 and a second payload subarea 402. For a division manner of the first payload subarea 401, refer to the division manner of the first payload subarea 301 shown in FIG. 3. Details are not described again. The second payload subarea 402 is divided, by a quantity of bytes, into a plurality of parts used to bear a passive optical network encapsulation method (GPON encapsulation method, GEM) frame. In this case, that the division manners of the first payload subarea 401 and the second payload subarea are different may indicate that a quantity of bytes included in the payload block obtained by dividing the first payload subarea 401 and a quantity of bytes included in the part used to bear the GEM frame in the second payload subarea are different.

Figure 5:
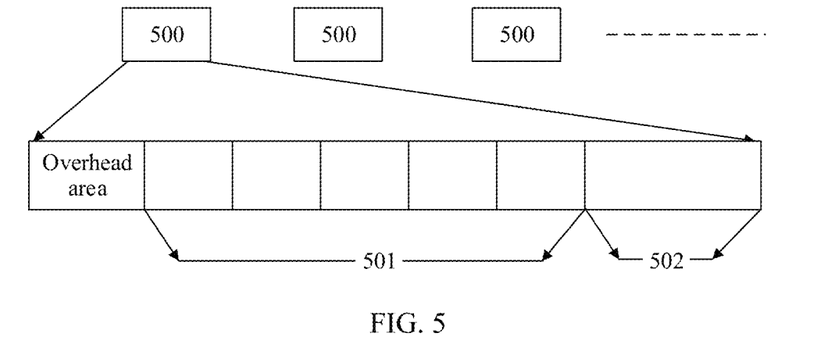
FIG. 5 is a schematic diagram of a third frame structure of a transmission frame according to an embodiment of the present disclosure.

Case 3: The network device is an ONU, and the transmission frame is a plurality of optical burst packets sent to an OLT through time division. FIG. 5 is a schematic diagram of a third frame structure of a transmission frame according to an embodiment of the present disclosure.

In the plurality of optical burst packets 500 sent by the ONU, a payload area of each optical burst packet 500 includes a first payload subarea 501 and a second payload subarea 502. For a division manner of the first payload subarea 501, refer to the division manner of the first payload subarea 301 shown in FIG. 3. For a division manner of the second payload subarea 502, refer to the descriptions of the second payload subarea 402 shown in FIG. 4. Details are not described again.

Step 202. The network device determines that a bandwidth of a to-be-transmitted service does not match a bandwidth of the first payload subarea.

The to-be-transmitted service is a service to be transmitted by the network device by using the first payload subarea. The to-be-transmitted service includes one or more services. A specific quantity of services included in the to-be-transmitted service is not limited in this embodiment.

In this embodiment, a case in which the bandwidth of the to-be-transmitted service does not match the bandwidth of the first payload subarea may be as follows: The bandwidth of the to-be-transmitted service is greater than the bandwidth of the first payload subarea. Alternatively, a case in which the bandwidth of the to-be-transmitted service does not match the bandwidth of the first payload subarea may be as follows: The bandwidth of the to-be-transmitted service is less than the bandwidth of the first payload subarea.

Step 203. The network device adjusts the bandwidth of the first payload subarea.

When the network device determines that the bandwidth of the to-be-transmitted service does not match the bandwidth of the first payload subarea, the network device adjusts the bandwidth of the first payload subarea. For example, if the bandwidth of the to-be-transmitted service is greater than the bandwidth of the first payload subarea, the network device allocates a partial bandwidth of the second payload subarea to the first payload subarea, to bear the to-be-transmitted service by increasing the bandwidth of the first payload subarea. For another example, if the bandwidth of the to-be-transmitted service is less than the bandwidth of the first payload subarea, the network device allocates a partial bandwidth of the first payload subarea to the second payload subarea, to improve bandwidth resource utilization of the first payload subarea by decreasing the bandwidth of the first payload subarea. It may be learned that the bandwidth of the first payload subarea is adjusted to ensure that an adjusted bandwidth of the first payload subarea matches the bandwidth of the to-be-transmitted service.

In the method in this embodiment, the bandwidth of the first payload subarea of the transmission frame can be flexibly adjusted based on the bandwidth of the to-be-transmitted service. When the bandwidth of the to-be-transmitted service is less than the bandwidth of the first payload subarea, bandwidth utilization of the first payload subarea can be improved. When the bandwidth of the to-be-transmitted service is greater than the bandwidth of the first payload subarea, successful transmission of the service can be ensured.

Figure 6:
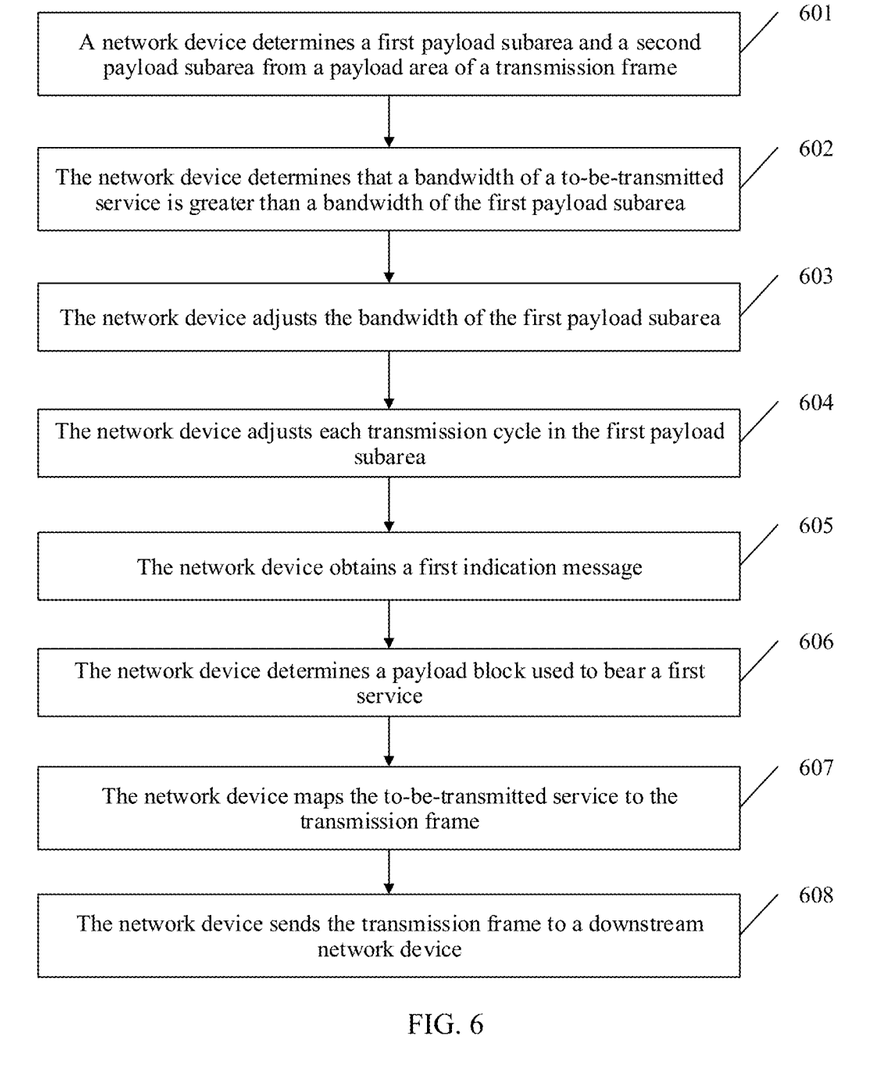
FIG. 6 is a flowchart of steps of a second embodiment of a bandwidth adjustment method according to an embodiment of the present disclosure.

The following describes a specific process in which the network device adjusts the bandwidth when the bandwidth of the to-be-transmitted service is greater than the bandwidth of the first payload subarea. FIG. 6 is a flowchart of steps of a second embodiment of a bandwidth adjustment method according to an embodiment of the present disclosure.

Step 601. A network device determines a first payload subarea and a second payload subarea from a payload area of a transmission frame.

For specific descriptions of step 601 in this embodiment, refer to the descriptions of step 201 in FIG. 2. Details are not described again.

Step 602. The network device determines that a bandwidth of a to-be-transmitted service is greater than a bandwidth of the first payload subarea.

The network device may determine, based on a bandwidth increase message, a case in which the bandwidth of the to-be-transmitted service is greater than the bandwidth of the first payload subarea. A source of the bandwidth increase message is not limited in this embodiment. The bandwidth increase message may be sent by a network management device connected to the network device. Alternatively, the bandwidth increase message may be sent by an upstream network device to the network device. The upstream network device is configured to send the to-be-transmitted service to the network device. If the network device is an OTN device, the upstream network device may be another OTN device, or may be an OLT. If the network device is an OLT, the upstream network device may be an OTN device, or may be an ONU. If the network device is an ONU, the upstream network device is an OLT.

Alternatively, the bandwidth increase message may be locally generated by the network device. Specifically, when the network device obtains the bandwidth of the to-be-transmitted service, the network device compares the bandwidth of the to-be-transmitted service with the bandwidth of the first payload subarea. When determining that the bandwidth of the to-be-transmitted service is greater than the bandwidth of the first payload subarea, the network device generates the bandwidth increase message.

Specific content of the bandwidth increase message is not limited in this embodiment, provided that the network device can determine, based on the bandwidth increase message, that the bandwidth of the to-be-transmitted service is greater than the bandwidth of the first payload subarea. For example, the bandwidth increase message is used to indicate an event of increasing the bandwidth of the first payload subarea and the bandwidth of the to-be-transmitted service.

Step 603. The network device adjusts the bandwidth of the first payload subarea.

In this embodiment, the network device allocates a partial bandwidth of the second payload subarea to the first payload subarea based on the bandwidth increase message, to ensure that a bandwidth of the first payload subarea to which the bandwidth is allocated matches the bandwidth of the to-be-transmitted service. The following describes a process of adjusting the first payload subarea by using an example and a specific frame structure.

As shown in FIG. 3, an example in which the second payload subarea 302 of the OTU frame includes a fixed quantity of 2.5 G timeslots is used. The network device allocates, to the first payload subarea 301 based on the bandwidth increase message, one 2.5 G timeslot that originally belongs to the second payload subarea. It may be learned that, if an original bandwidth of the first payload subarea 301 is 2.5 G, an adjusted bandwidth of the first payload subarea 301 is 5 G.

As shown in FIG. 4, the second payload subarea 402 of the GTC frame includes a plurality of bytes. The network device (OLT) allocates, to the first payload subarea 401 based on the bandwidth increase message, a byte set that originally belongs to the second payload subarea. The byte set includes a plurality of bytes that are originally located in the second payload subarea 402 and whose locations are consecutive. For example, if the first payload subarea 401 includes N bytes, and the byte set allocated by the network device to the first payload subarea 401 includes M bytes, the first payload subarea 401 to which the byte set is allocated includes N+M bytes.

In this example, the bandwidth increase message is specifically used to indicate a quantity of bytes included in the byte set and a location of a start byte of the byte set in the second payload subarea 402. It may be learned that, when obtaining the bandwidth increase message, the network device may allocate the byte set to the first payload subarea 401 based on the bandwidth increase message, to ensure that the to-be-transmitted service can be successfully transmitted by using the first payload subarea 401 to which the byte set is allocated.

As shown in FIG. 5, the second payload subarea 502 of each optical burst packet 500 includes a plurality of bytes. For descriptions that the network device (ONU) allocates, to the first payload subarea 501 based on the bandwidth increase message, a bandwidth that originally belongs to the second payload subarea 502, refer to FIG. 4. Details are not described again.

Step 604. The network device adjusts each transmission cycle in the first payload subarea.

In this embodiment, after the bandwidth of the first payload subarea is increased, a quantity of payload blocks included in each transmission cycle included in the first payload subarea needs to be adjusted.

For example, the network device adjusts the transmission cycle based on a first quantity. The first quantity is the quantity of payload blocks included in each transmission cycle in the first payload subarea. To ensure successful transmission of the to-be-transmitted service, it should be ensured that, when the transmission cycle includes a first quantity of payload blocks, a bandwidth of the transmission cycle is greater than or equal to the bandwidth of the to-be-transmitted service.

A source of the first quantity is not limited in this embodiment. For example, for the source of the first quantity, refer to the descriptions of the source of the bandwidth increase message shown in FIG. 3. Details are not described again.

In this embodiment, an example in which the first quantity is obtained by the network device through local calculation is used for description. For example, the network device performs calculation based on the following formula to obtain the first quantity:

PN=floor [RN/PBN], where PN is the first quantity, floor represents rounding down, RN is an adjusted bandwidth of the first payload subarea, and PBN is a bandwidth of a single payload block.

Before the bandwidth of the first payload subarea is adjusted, the bandwidth of the first payload subarea is less than the bandwidth of the to-be-transmitted service. It indicates that the transmission cycle existing before the bandwidth of the first payload subarea is adjusted cannot be used to bear the to-be-transmitted service. A quantity of payload blocks included in the transmission cycle is P. To successfully transmit the to-be-transmitted service, the network device increases, to the first quantity PN, the quantity of payload blocks included in each transmission cycle in the first payload subarea. It may be learned that PN>P.

When the network device adjusts, to the first quantity PN, the quantity of payload blocks in the transmission cycle included in the first payload subarea, the network device completes adjustment of the transmission cycle. To ensure that a downstream network device can successfully obtain the service from the transmission frame through demapping, the downstream network device needs to accurately determine a location of each transmission cycle in the first payload subarea. The downstream network device is configured to receive the to-be-transmitted service from the network device.

To ensure that the downstream network device determines the location of each transmission cycle in the first payload subarea, the network device sends a multiframe indication message to the downstream network device. The multiframe indication message is used to indicate a multiframe cycle and a quantity of transmission cycles included in the multiframe cycle. The downstream network device may perform service demapping based on the multiframe cycle. Specifically, the first byte and the last byte in a plurality of transmission cycles included in the multiframe cycle respectively coincide with a start location and an end location of the multiframe cycle.

A manner in which the network device specifically sends the multiframe indication message to the downstream network device is not limited in this embodiment. For example, the network device includes the multiframe indication message into overheads of the transmission cycle included in the multiframe cycle. For another example, the network device carries the multiframe indication message by using an idle payload block in the multiframe cycle. In this embodiment, the network device may repeatedly send the multiframe indication message a plurality of times, to ensure that the downstream network device can successfully receive the multiframe indication message.

Optionally, when the downstream network device successfully obtains the multiframe indication message, the downstream network device may return an acknowledgment message to the network device. The network device may determine, based on the acknowledgement message, that the downstream network device can successfully obtain the service from the multiframe cycle through demapping.

Step 605. The network device obtains a first indication message.

The first indication message is used to indicate a first bandwidth of a first service. The first service is one service whose bandwidth is increased in the to-be-transmitted service. A quantity of first services is not limited in this embodiment. For descriptions of a source of the first indication message, refer to the descriptions of the source of the bandwidth increase message in step 602. Details are not described again.

Step 606. The network device determines a payload block used to bear the first service.

The network device in this embodiment determines, from the transmission cycle based on the first indication message, the payload block used to bear the first service. A quantity of payload blocks used to bear the first service is not limited in this embodiment, provided that a bandwidth of the payload block used to bear the first service is greater than or equal to the first bandwidth. The following is described by using a specific frame structure.

Figure 7:
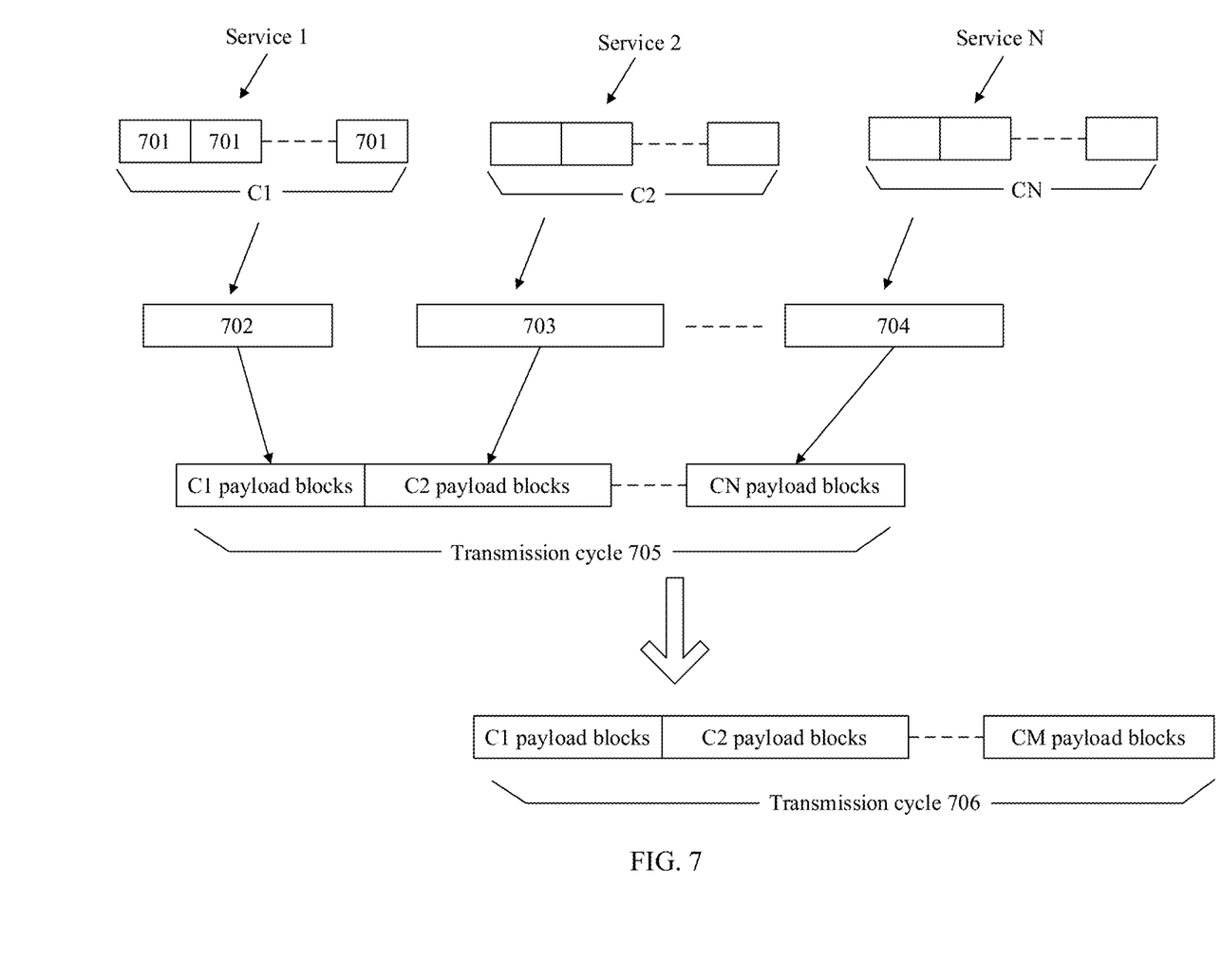
FIG. 7 is a schematic diagram of mapping a service to a first payload subarea according to an embodiment of the present disclosure.

FIG. 7 is a schematic diagram of mapping a service to a first payload subarea according to an embodiment of the present disclosure. The to-be-transmitted service includes a service 1, a service 2, . . . , and a service N. When the bandwidth of the first payload subarea is not adjusted, the service 1 is used as an example, and the network device maps the service 1 to C1 flexible optical service units (flexible optical service unit, OSUflex) 701. C1 consecutive OSUflex 701 is then mapped to a flexible tributary unit (flexible tributary unit, TUflex) 702. The TUflex 702 includes C1 payload blocks. One OSUflex 701 corresponds to one payload block. By analogy, the network device maps the service 2 to TUflex 703 having C2 payload blocks. The network device maps the service N to TUflex 704 having CN payload blocks. The network device may evenly distribute N TUflex in one transmission cycle 705 in the first payload subarea in a manner such as a Sigma-Delta algorithm. The transmission cycle 705 before adjustment includes P payload blocks.

The network device may map each TUflex to a flexible optical data unit (flexible optical data unit, ODUflex) frame. Then, the network device maps the ODUflex frame to the first payload subarea. Alternatively, the network device may directly map each TUflex to the first payload subarea.

When the to-be-transmitted service includes the first service whose bandwidth is increased, for example, the first service is the service N shown in FIG. 7, the network device increases the bandwidth of the first payload subarea based on the foregoing step, so that an adjusted transmission cycle 706 includes the first quantity PN of payload blocks.

However, a bandwidth of CN payload blocks that correspond to the service N and that are in the first payload subarea is less than a bandwidth of the service N. To transmit the service N, a quantity CN of payload blocks corresponding to the service N needs to be adjusted. Specifically, the network device increases the CN payload blocks in the first payload subarea to CM payload blocks based on the first bandwidth indicated by the first indication message. It may be learned that CM is greater than CN. A bandwidth of the CM payload blocks is greater than or equal to the first bandwidth of the service N, to effectively ensure that the transmission frame is used to bear the to-be-transmitted service.

Optionally, the first indication message may be further used to indicate that an adjustment step X (gigabit per second (Gbps)). The network device adjusts, based on the adjustment step, the quantity of payload blocks corresponding to the first service. In addition, in each time of adjustment, the bandwidth of the payload block corresponding to the first service is increased by the adjustment step X, until a bandwidth of the payload block after adjustment is completed is greater than or equal to the first bandwidth.

Step 607. The network device maps the to-be-transmitted service to the transmission frame.

In this embodiment, after completing the process in steps 601 to 606, the network device may send an adjustment complete indication message to the network management device or the upstream network device. The network management device or the upstream network device determines, based on the adjustment complete indication message, that the network device completes adjustment of the bandwidth of the first payload subarea.

The following describes, by using an example, a process in which the network device maps the to-be-transmitted service.

Example 1: The network device is an intermediate node in a service transmission path. The service transmission path is a path formed by network devices that the to-be-transmitted service successively passes through in a transmission process.

The network device receives the transmission frame from the upstream network device. The network device obtains a payload block from the transmission frame from the upstream network device through demapping, where the payload block bears the to-be-transmitted service. For example, if the to-be-transmitted service is used for transmission from an OTN to a PON, the network device may be an OTN device, the upstream network device may be another OTN device, and the downstream network device may be an OLT device. The network device may map, to the first payload subarea of the transmission frame, a payload block used for transmission to a same downstream network device.

Example 2: The network device is an initial node in a service transmission path. First, the network device receives the to-be-transmitted service. Then, the network device maps the to-be-transmitted service to a payload block. Finally, the network device maps the payload block to the first payload subarea of the transmission frame. For a specific process, refer to FIG. 7. Details are not described again. For example, if the to-be-transmitted service is used for transmission from a PON to an OTN, the network device may be an ONU. The network device receives the to-be-transmitted service from a user-side device (such as a computer, a telephone, or a television). The downstream network device may be an OLT.

Step 608. The network device sends the transmission frame to the downstream network device.

When the first payload subarea of the transmission frame already successfully bears the to-be-transmitted service, the network device may send the transmission frame to the downstream network device, to effectively ensure successful transmission of the service.

In the method in this embodiment, when the bandwidth of the to-be-transmitted service that needs to be transmitted by the network device is greater than the bandwidth of the first payload subarea, the network device increases the bandwidth of the first payload subarea. Therefore, the adjusted first payload subarea can be used to successfully bear the to-be-transmitted service, to ensure successful transmission of the service. In this way, the bandwidth of the first payload subarea is flexibly adjusted.

Figure 8:
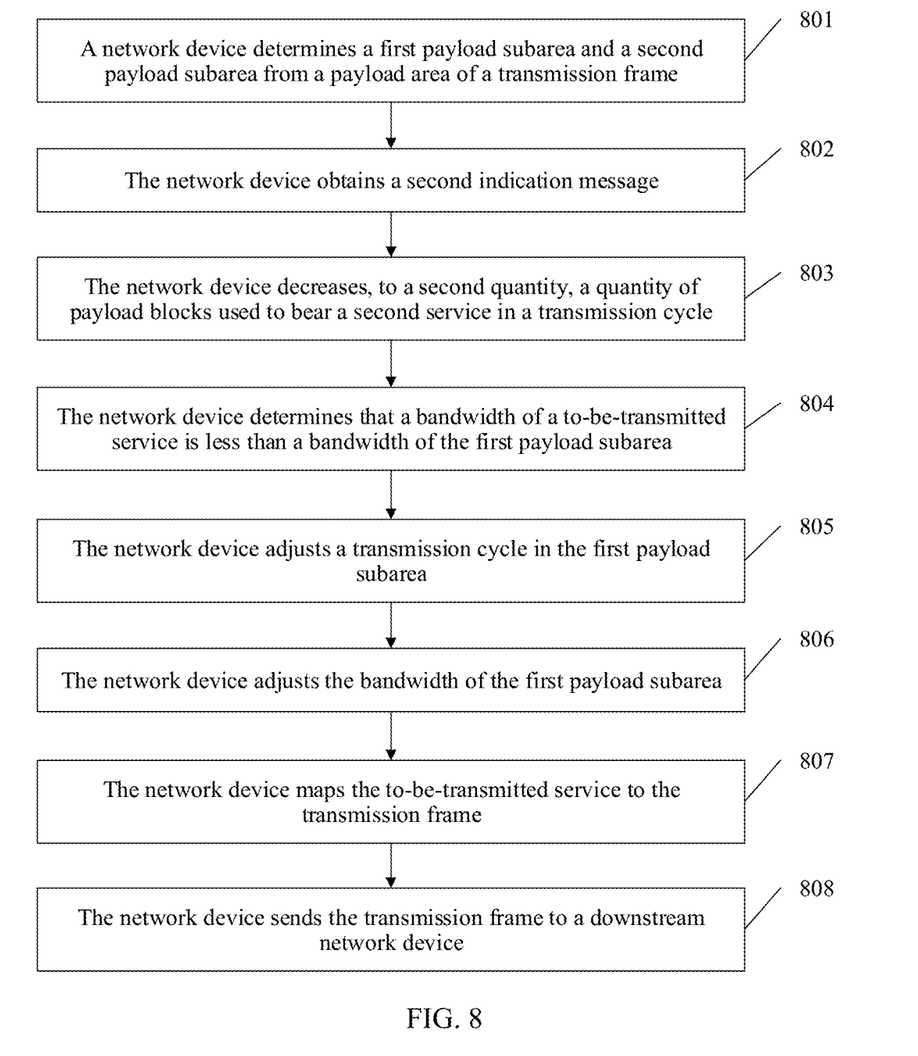
FIG. 8 is a flowchart of steps of a third embodiment of a bandwidth adjustment method according to an embodiment of the present disclosure.

The following describes a specific process in which the network device adjusts the bandwidth when the bandwidth of the to-be-transmitted service that needs to be transmitted by the network device is less than the bandwidth of the first payload subarea. FIG. 8 is a flowchart of steps of a third embodiment of a bandwidth adjustment method according to an embodiment of the present disclosure.

Step 801. A network device determines a first payload subarea and a second payload subarea from a payload area of a transmission frame.

For descriptions of step 801 in this embodiment, refer to the descriptions of step 601 shown in FIG. 6. Details are not described again.

Step 802. The network device obtains a second indication message.

The second indication message is used to indicate a second bandwidth of a second service. The second service is one service whose bandwidth is decreased in a to-be-transmitted service. A quantity of second services included in the to-be-transmitted service is not limited in this embodiment. For descriptions of a source of the second indication message, refer to the descriptions of the source of the bandwidth increase message in step 602. Details are not described again.

Step 803. The network device decreases, to a second quantity, a quantity of payload blocks used to bear the second service in each transmission cycle.

In this embodiment, the network device determines, based on the second indication message, that the bandwidth of the second service in the to-be-transmitted service is decreased, and the network device decreases, to the second quantity, the quantity of payload blocks used to bear the second service in each transmission cycle in the first payload subarea. A specific value of the second quantity is not limited in this embodiment, provided that a bandwidth of the second quantity of payload blocks is greater than or equal to the second bandwidth. For better understanding, the following continues to be described with reference to FIG. 7.

When a bandwidth of the first payload subarea is not adjusted, for details of a process in which a service 1, a service 2, . . . , and a service N are mapped to a transmission cycle 705, refer to step 606. Details are not described again.

In this embodiment, an example in which the service N is the second service is used for description. When a bandwidth of the service N is decreased, a bandwidth of CN payload blocks corresponding to the service N in the first payload subarea is greater than the bandwidth of the service N. If the service N is borne by using the CN payload blocks, an idle payload block that does not bear a service exists in the CN payload blocks. This reduces bandwidth resource utilization of the transmission frame.

To ensure bandwidth resource utilization of the transmission frame, the network device decreases the CN payload blocks in the first payload subarea to CM payload blocks based on the second bandwidth indicated by the second indication message. It may be learned that CM is less than CN. A bandwidth of the CM payload blocks is greater than or equal to the second bandwidth of the service N. Therefore, bandwidth resource utilization is effectively improved while it is ensured that the transmission frame is used to bear a service.

Step 804. The network device determines that a bandwidth of the to-be-transmitted service is less than the bandwidth of the first payload subarea.

The network device may determine, based on a bandwidth decrease message, a case in which the bandwidth of the to-be-transmitted service is less than the bandwidth of the first payload subarea. For descriptions of a source of the bandwidth decrease message, refer to the descriptions of the source of the bandwidth increase message in step 602 in FIG. 6. Details are not described again.

Specific content of the bandwidth decrease message is not limited in this embodiment, provided that the network device can determine, based on the bandwidth decrease message, that the bandwidth of the to-be-transmitted service is less than the bandwidth of the first payload subarea. For example, the bandwidth decrease message is used to indicate an event of decreasing the bandwidth of the first payload subarea and the bandwidth of the to-be-transmitted service.

Step 805. The network device adjusts a transmission cycle in the first payload subarea.

In this embodiment, when the bandwidth of the to-be-transmitted service is less than the bandwidth of the first payload subarea, the transmission cycle in the first payload subarea needs to be adjusted. For descriptions of the transmission cycle, refer to the descriptions of step 604 in FIG. 6. Details are not described again.

For example, the network device adjusts the transmission cycle based on a third quantity. The network device adjusts, to the third quantity, a quantity of payload blocks included in each transmission cycle in the first payload subarea. A source of the third quantity is not limited in this embodiment. For the source of the third quantity, refer to the descriptions of the first quantity in step 604 in FIG. 6. Details are not described again.

In this embodiment, an example in which the third quantity is obtained by the network device through local calculation is used for description. For a specific calculation process, refer to the process in which the network device obtains the first quantity through calculation in step 604 in FIG. 6. Details are not described again.

Before the first payload subarea is adjusted, the bandwidth of the first payload subarea is greater than the bandwidth of the to-be-transmitted service. It indicates that the transmission cycle existing before the bandwidth of the first payload subarea is adjusted includes an idle payload block that does not bear a service. To improve utilization of the payload block, the network device decreases, to the third quantity, the quantity of payload blocks included in each transmission cycle in the first payload subarea. It may be learned that a quantity of payload blocks included in each adjusted transmission cycle is less than the quantity of payload blocks included in the transmission cycle before adjustment. This effectively reduces a quantity of idle payload blocks included in each transmission cycle.

The network device sends a multiframe indication message to a downstream network device. For descriptions of the multiframe indication message, refer to step 604 in FIG. 6. Details are not described again.

Step 806. The network device adjusts the bandwidth of the first payload subarea.

In this embodiment, the network device allocates a partial bandwidth of the first payload subarea to the second payload subarea based on the bandwidth decrease message, to improve bandwidth resource utilization of the first payload subarea. The following describes a process of adjusting the first payload subarea by using an example and a specific frame structure.

As shown in FIG. 3, an example in which the second payload subarea 302 of the OTU frame includes a fixed quantity of 2.5 G timeslots is used. The network device (OTN device) allocates, to the second payload subarea 302 based on the bandwidth decrease message, one 2.5 G timeslot that originally belongs to the first payload subarea 301. It may be learned that, if an original bandwidth of the second payload subarea 302 is 2.5 G, an adjusted bandwidth of the second payload subarea 302 is 5 G.

As shown in FIG. 4, the second payload subarea 402 of the GTC frame includes a plurality of bytes. The network device (OLT) allocates, to the second payload subarea 402 based on the bandwidth decrease message, a byte set that originally belongs to the first payload subarea 401. The byte set includes a plurality of bytes that are originally located in the first payload subarea 401 and whose locations are consecutive. For example, if the second payload subarea 402 includes N bytes, and the byte set allocated by the network device to the second payload subarea 402 includes M bytes, the second payload subarea 402 to which the byte set is allocated includes N+M bytes.

In this example, the bandwidth decrease message is specifically used to indicate a quantity of bytes included in the byte set and a location of a start byte of the byte set in the first payload subarea 401. It may be learned that, when obtaining the bandwidth decrease message, the network device may allocate the byte set to the second payload subarea 402 based on the bandwidth decrease message, to improve bandwidth resource utilization of the first payload subarea 401.

As shown in FIG. 5, the second payload subarea 502 of each optical burst packet 500 includes a plurality of bytes. For descriptions that the network device (ONU) allocates, to the second payload subarea 502 based on the bandwidth decrease message, a bandwidth that originally belongs to the first payload subarea 501, refer to FIG. 4. Details are not described again.

Step 807. The network device maps the to-be-transmitted service to the transmission frame.

Step 808. The network device sends the transmission frame to the downstream network device.

For a specific process of steps 807 and 808, refer to steps 607 and 608 shown in FIG. 6. Details are not described again.

In the method in this embodiment, when the bandwidth of the to-be-transmitted service that needs to be transmitted by the network device is less than the bandwidth of the first payload subarea, the network device determines that the first payload subarea of the transmission frame includes an idle payload block, and the network device decreases the bandwidth of the first payload subarea. Therefore, the adjusted first payload subarea can be used to successfully bear the to-be-transmitted service, and bandwidth resource utilization of the first payload subarea can be further improved.

Figure 9:
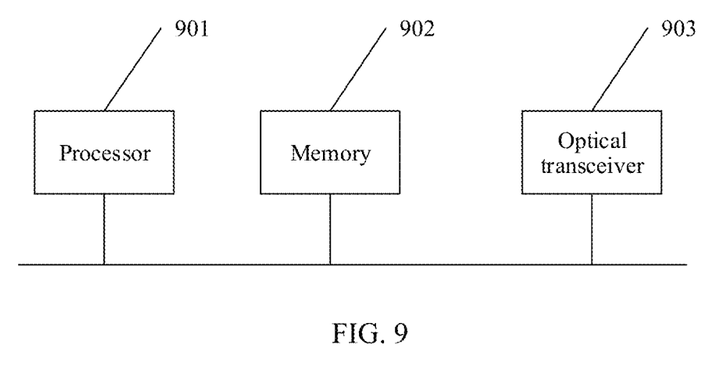
FIG. 9 is a schematic diagram of a structure of a network device according to an embodiment of the present disclosure.

FIG. 9 is a schematic diagram of a structure of a network device according to an embodiment of the present disclosure. The network device includes a processor 901, a memory 902, and an optical transceiver 903. The processor 901, the memory 902, and the optical transceiver 903 are connected to each other by using a line. The memory 902 is configured to store program instructions and data.

The memory 902 of the network device stores program instructions and data that are executed by the network device and that are in the steps shown in FIG. 2, FIG. 6, and FIG. 8. The processor 901 and the optical transceiver 903 are configured to perform steps of the method in any one of the embodiments of FIG. 2, FIG. 6, and FIG. 8. In FIG. 2, the processor 901 is configured to perform step 201 to step 203. In FIG. 6, the processor 901 is configured to perform step 601 to step 607. The optical transceiver 903 is configured to perform step 608. In FIG. 8, the processor 901 is configured to perform step 801 to step 807. The optical transceiver 903 is configured to perform step 808.

An embodiment of this application further provides a digital processing chip. The digital processing chip is integrated with a circuit configured to implement the function of the processor 901 and one or more interfaces. When the digital processing chip is integrated with a memory, the digital processing chip may complete steps of the method in any one or more embodiments in the foregoing embodiments. When the digital processing chip is integrated with no memory, the digital processing chip may be connected to an external memory through an interface. The digital processing chip implements, based on program code stored in the external memory, an action executed by the network device in the foregoing embodiments.

The foregoing descriptions are merely specific embodiments of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A bandwidth adjustment method, wherein the method comprises:
   determining a first payload subarea and a second payload subarea from a payload area of a transmission frame, wherein division manners of the first payload subarea and the second payload subarea are different, the first payload subarea is divided into a plurality of payload blocks used to bear at least one service;
   determining that a bandwidth of the at least one service does not match a bandwidth of the first payload subarea; and
   adjusting the bandwidth of the first payload subarea, wherein an adjusted bandwidth of the first payload subarea matches the bandwidth of the at least one service,
   wherein before the determining that a bandwidth of the at least one service does not match a bandwidth of the first payload subarea, the method further comprises:
   obtaining a second indication message, wherein the second indication message is used to indicate a second bandwidth of a second service, and the second service is one service having a bandwidth that is decreased in the at least one service; and
   decreasing, to a second quantity based on the second indication message, a quantity of payload blocks used to bear the second service in each transmission cycle in the first payload subarea, wherein a bandwidth of the second quantity of payload blocks is greater than or equal to the second bandwidth.

2. The method according to claim 1, wherein the adjusting the bandwidth of the first payload subarea comprises: based on the bandwidth of the at least one service being greater than the bandwidth of the first payload subarea, allocating a partial bandwidth of the second payload subarea to the first payload subarea.

3. The method according to claim 2, wherein after the adjusting the bandwidth of the first payload subarea, the method further comprises:
   obtaining a first quantity, wherein the first quantity is a quotient between the bandwidth of the first payload subarea and a bandwidth of the payload block; and
   increasing, to the first quantity, a quantity of payload blocks comprised in each transmission cycle in the first payload subarea.

4. The method according to claim 3, wherein the method further comprises:
   obtaining a first indication message, wherein the first indication message is used to indicate a first bandwidth of a first service, the first service is one service having a bandwidth that is increased in the at least one service; and
   after the increasing, to the first quantity, a quantity of payload blocks comprised in each transmission cycle in the first payload subarea, the method further comprises:
   determining, from each transmission cycle based on the first indication message, a payload block used to bear the first service, wherein a bandwidth of the payload block used to bear the first service is greater than or equal to the first bandwidth.

5. The method according to claim 1, wherein after the determining that a bandwidth of the at least one service does not match a bandwidth of the first payload subarea, the method further comprises:
   based on the bandwidth of the at least one service being less than the bandwidth of the first payload subarea, obtaining a third quantity, wherein a bandwidth of the third quantity of payload blocks is greater than or equal to the bandwidth of the at least one service; and
   decreasing, to the third quantity, a quantity of payload blocks comprised in each transmission cycle in the first payload subarea.

6. The method according to claim 5, wherein the adjusting the bandwidth of the first payload subarea comprises:
   allocating a partial bandwidth of the first payload subarea to the second payload subarea.

7. The method according to claim 6, wherein the second payload subarea is divided into a plurality of timeslots, a plurality of code blocks, or a plurality of bytes.

8. The method according to claim 7, wherein the transmission frame is an optical transport unit (OTU) frame, a passive optical network transmission convergence frame, or an optical burst packet.

9. A network device, comprising:
   a processor and a memory, wherein the processor invokes program code in the memory to perform the following steps:
   determining a first payload subarea and a second payload subarea from a payload area of a transmission frame, wherein the first payload subarea is divided into a plurality of payload blocks used to bear at least one service, and division manners of the first payload subarea and the second payload subarea are different;
   determining that a bandwidth of the at least one service does not match a bandwidth of the first payload subarea; and
   adjusting the bandwidth of the first payload subarea, wherein an adjusted bandwidth of the first payload subarea matches the bandwidth of the at least one service,
   wherein the processor is further configured to:
   obtain a second indication message, wherein the second indication message is used to indicate a second bandwidth of a second service, and the second service is one service having a bandwidth that is decreased in the at least one service; and
   decrease, to a second quantity based on the second indication message, a quantity of payload blocks used to bear the second service in each transmission cycle in the first payload subarea, wherein a bandwidth of the second quantity of payload blocks is greater than or equal to the second bandwidth.

10. The network device according to claim 9, wherein when adjusting the bandwidth of the first payload subarea, the processor is configured to:
  based on the bandwidth of the at least one service being greater than the bandwidth of the first payload subarea, allocate a partial bandwidth of the second payload subarea to the first payload subarea.

11. The network device according to claim 10, wherein the processor is further configured to:
  obtain a first quantity, wherein the first quantity is a quotient between the bandwidth of the first payload subarea and a bandwidth of the payload block; and
  increase, to the first quantity, a quantity of payload blocks comprised in each transmission cycle in the first payload subarea.

12. The network device according to claim 11, wherein the processor is further configured to:
  obtain a first indication message, wherein the first indication message is used to indicate a first bandwidth of a first service, and the first service is one service having a bandwidth that is increased in the at least one service; and
  determine, from each transmission cycle based on the first indication message, a payload block used to bear the first service, wherein a bandwidth of the payload block used to bear the first service is greater than or equal to the first bandwidth.

13. The network device according to claim 9, wherein the processor is further configured to:
  based on the bandwidth of the at least one service being less than the bandwidth of the first payload subarea, obtain a third quantity, wherein a bandwidth of the third quantity of payload blocks is greater than or equal to the bandwidth of the at least one service; and
  decrease, to the third quantity, a quantity of payload blocks comprised in each transmission cycle in the first payload subarea.

14. The network device according to claim 13, wherein when adjusting the bandwidth of the first payload subarea, the processor is configured to:
  allocate a partial bandwidth of the first payload subarea to the second payload subarea.

15. The network device according to claim 10, wherein the second payload subarea is divided into a plurality of timeslots, a plurality of code blocks, or a plurality of bytes.

16. The method according to claim 1, wherein the transmission frame is an optical transport unit (OTU) frame, a passive optical network transmission convergence frame, or an optical burst packet.

17. The network device according to claim 9, wherein the second payload subarea is divided into a plurality of timeslots, a plurality of code blocks, or a plurality of bytes.

18. The network device according to claim 9, wherein the transmission frame is an optical transport unit OTU frame, a passive optical network transmission convergence GTC frame, or an optical burst packet.

* * * * *